US012650392B2

(12) United States Patent
Zhang et al.

(10) Patent No.: US 12,650,392 B2
(45) Date of Patent: *Jun. 9, 2026

(54) DETECTION APPARATUS AND BATTERY PRODUCTION DEVICE

(71) Applicant: CONTEMPORARY AMPEREX TECHNOLOGY CO., LIMITED, Ningde (CN)

(72) Inventors: Fenglin Zhang, Ningde (CN); Jianlin Liu, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/295,410

(22) Filed: Aug. 8, 2025

(65) Prior Publication Data

US 2025/0362247 A1 Nov. 27, 2025

Related U.S. Application Data

(63) Continuation of application No. PCT/CN2023/143440, filed on Dec. 29, 2023.

(30) Foreign Application Priority Data

Jun. 30, 2023 (CN) .......................... 202310798420.8

(51) Int. Cl.
| | |
|---|---|
| *G01N 23/04* | (2018.01) |
| *H01M 6/00* | (2006.01) |
| *H01M 10/04* | (2006.01) |

(52) U.S. Cl.
CPC ............ *G01N 23/04* (2013.01); *H01M 6/005* (2013.01); *H01M 10/04* (2013.01); (Continued)

(58) Field of Classification Search
CPC ......... G06T 7/0006; G06T 2207/20084; G06T 2207/20081; G06T 2207/10081; (Continued)

(56) References Cited

U.S. PATENT DOCUMENTS

| | | | |
|---|---|---|---|
| 2004/0161073 A1* | 8/2004 | Nokita ................. | A61B 6/5282 378/4 |
| 2019/0150865 A1* | 5/2019 | Johnson ............... | A61B 6/4405 |

(Continued)

FOREIGN PATENT DOCUMENTS

| | | |
|---|---|---|
| CN | 110632088 A | 12/2019 |
| CN | 212433015 U | 1/2021 |

(Continued)

OTHER PUBLICATIONS

International Search Report dated Mar. 14, 2024 for application PCT/CN2023/143440.

(Continued)

*Primary Examiner* — Irakli Kiknadze
(74) *Attorney, Agent, or Firm* — Ladas & Parry, LLP

(57) ABSTRACT

A detection apparatus and a battery production device are described. The detection apparatus includes a support frame, a ray source, a probe, and a carrying platform. The support frame includes a support arm, the ray source and the probe are both connected to the support arm, with the probe facing an exiting port of the ray source, and the carrying platform is located between the ray source and the probe, wherein the ray source and the probe are rotatable about a same rotation axis, and a rotation direction of the ray source is the same as that of the probe, such that during rotation, the probe remains facing the exiting port of the ray source and the carrying platform is located between the ray source and the probe.

17 Claims, 9 Drawing Sheets

(52) U.S. Cl.
CPC . *G01N 2223/306* (2013.01); *G01N 2223/308* (2013.01); *G01N 2223/309* (2013.01); *G01N 2223/3305* (2013.01); *G01N 2223/645* (2013.01); *G01N 2223/646* (2013.01)

(58) Field of Classification Search
CPC .... G06T 7/62; G06T 7/50; G06T 7/70; G06T 2207/10116; G06T 2207/20068; G06T 2207/30112; G06T 7/337; G06T 2207/30008; G06T 2207/10121; G06T 2207/10124; G06T 15/08; G06T 17/00; G06T 15/205; G06T 7/20; G06T 7/75; G06T 7/30; G06T 2207/30208; G06T 2207/10072; G06T 2210/41; G06T 2200/04; G06T 2207/30241; G06T 2207/30004; G06T 2207/30196; G06T 2207/10021; G06T 2207/30244; G06T 2207/10132; G06T 2207/30204; G06T 19/00; G06T 7/0012; G06T 7/80; G06T 7/344; G06T 7/0014; G06T 7/0004; H01M 10/48; H01M 10/4285; H01M 6/005; H01M 10/04; H01M 10/0413; H01M 2220/20; H01M 10/058; G01N 23/046; G01N 23/04; G01N 2223/32; G01N 2223/3307; G01N 2223/3306; G01N 2223/321; G01N 2223/401; G01N 2223/419; G01N 2223/3308; G01N 21/88; G01N 21/95; G01N 21/8851; G01N 2223/308; G01N 2223/306; G01N 2021/8887; G01N 2223/629; G01N 2223/645; G01N 2223/309; G01N 2223/3305; G01N 2223/646; G01N 23/18; G01N 21/01; G01N 2223/643; G01N 23/083; G01N 2223/304; G01N 2223/33; G01N 2223/3303; G01N 2223/611; G01N 2223/607; B65G 47/22; B65G 43/08; G01T 1/2985; G01T 7/00; G06V 10/44; G06V 10/25; G06V 2201/07; G06V 2201/06; G06V 20/647; G06V 10/74; G01V 5/226; A61B 2560/0223; A61B 6/4283; A61B 6/502; A61B 6/00; A61B 6/467; A61B 6/4423; A61B 5/4872; A61B 5/68; A61B 5/0537; A61B 6/44; A61B 6/56; A61B 6/03; A61B 6/4441; A61B 6/4405; A61B 6/035; A61B 34/32; A61B 34/30; A61B 34/20; A61B 2034/2068; A61B 2034/107; A61B 2090/3762; A61B 2090/376; A61B 2034/2051; A61B 2034/2055; A61B 2034/2059; A61B 2090/3937; A61B 2090/3764; A61B 2034/2065; A61B 2090/3983; A61B 2090/374; A61B 6/582; A61B 6/547; A61B 2090/378; A61B 6/487; A61B 2017/00725; A61B 2090/364; A61B 2090/3966; A61B 6/5247; A61B 6/5235; A61B 90/39; C09D 7/40; C09D 7/61; C09D 5/14; C09D 4/00; G06F 3/041; G06F 3/14; A01N 25/10; A01N 59/16; B22F 1/00; B22F 9/00; G16H 30/20; G16H 30/40; G16H 20/40; G16H 50/50; G09G 2380/08; G09G 2340/12; G09G 5/377; G01R 31/36; Y02E 60/10; G01B 11/16; G01B 15/06
USPC ................................................... 378/4, 19, 57
See application file for complete search history.

(56) References Cited

U.S. PATENT DOCUMENTS

| | | | | |
|---|---|---|---|---|
| 2023/0258582 | A1* | 8/2023 | Sakai | G01N 23/046 378/20 |
| 2024/0265519 | A1* | 8/2024 | Shin | G06T 7/0006 |
| 2024/0410837 | A1* | 12/2024 | Huang | G01N 23/046 |

FOREIGN PATENT DOCUMENTS

| | | | |
|---|---|---|---|
| CN | 115508389 | A | 12/2022 |
| CN | 115950905 | A | 4/2023 |
| CN | 115963571 | A | 4/2023 |
| CN | 115963572 | A | 4/2023 |
| CN | 115980097 | A | 4/2023 |
| CN | 116046779 | A | 5/2023 |
| DE | 102015222076 | A1 | 5/2017 |
| GB | 2 443 432 | A | 5/2008 |

OTHER PUBLICATIONS

Chinese Office Action dated Aug. 9, 2025 for application CN 202310798420.8.
Extended European Search Report dated Apr. 9, 2026 for application EP 23943505.0.

* cited by examiner

4111

413

4131

4111

450

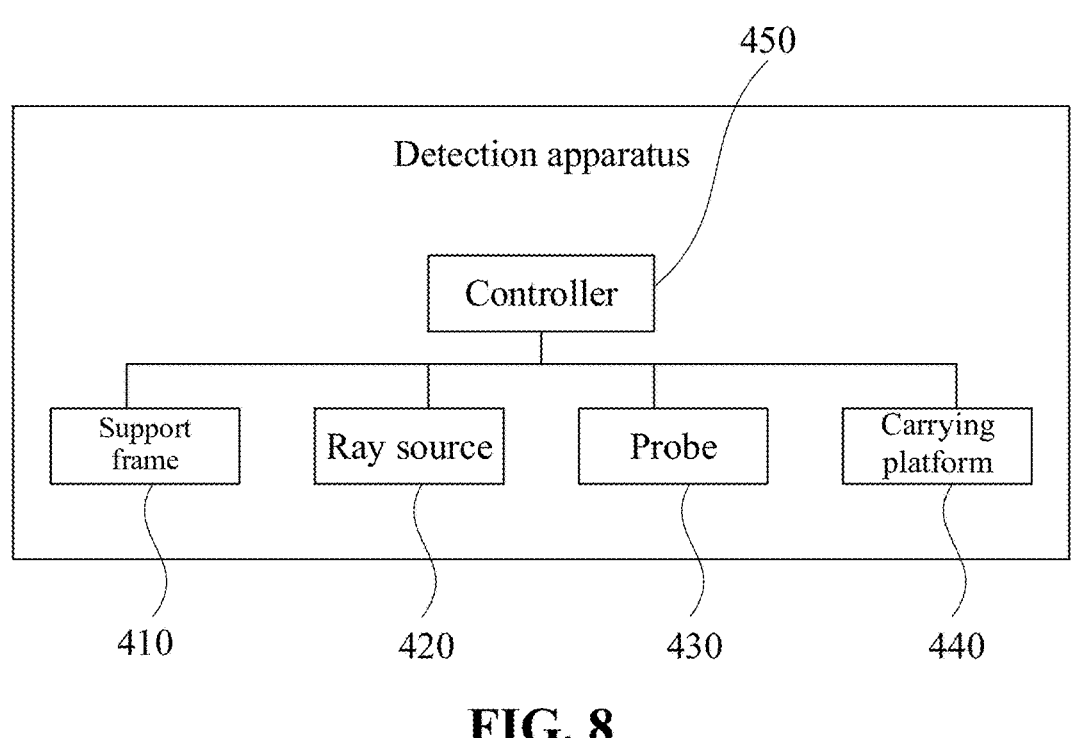

FIG. 8

| Controlling a ray source and a probe to rotate about a rotation axis | S10 |

| When the ray source rotates, controlling the ray source to emit rays that pass through a battery to be detected on a carrying platform and are cast to the probe | S20 |

| Acquiring a detection image for the battery to be detected based on the rays received by the probe | S30 |

| Determining gluing information for the battery to be detected based on the detection image | S40 |

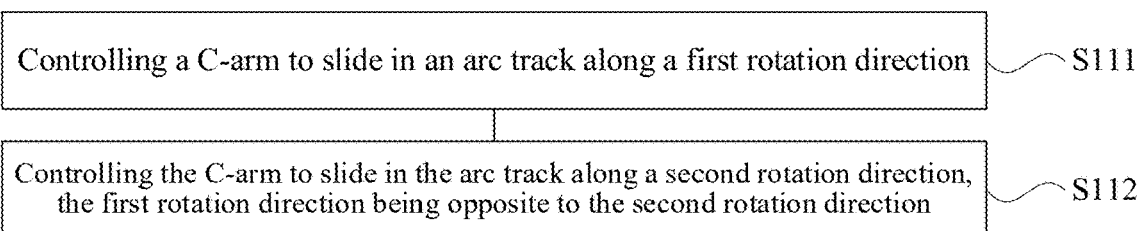

FIG. 10

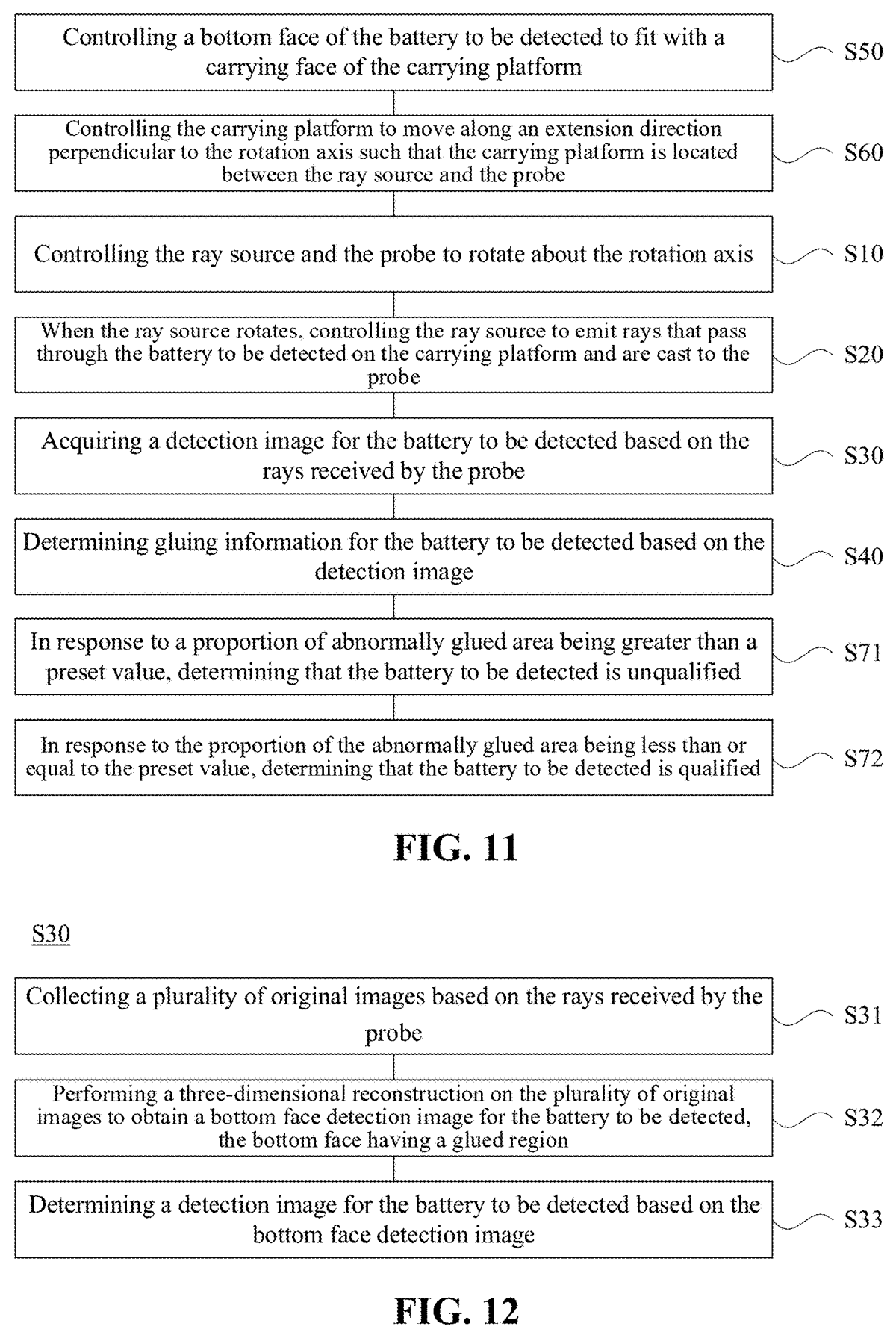

Controlling a bottom face of the battery to be detected to fit with a carrying face of the carrying platform — S50

Controlling the carrying platform to move along an extension direction perpendicular to the rotation axis such that the carrying platform is located between the ray source and the probe — S60

Controlling the ray source and the probe to rotate about the rotation axis — S10

When the ray source rotates, controlling the ray source to emit rays that pass through the battery to be detected on the carrying platform and are cast to the probe — S20

Acquiring a detection image for the battery to be detected based on the rays received by the probe — S30

Determining gluing information for the battery to be detected based on the detection image — S40

In response to a proportion of abnormally glued area being greater than a preset value, determining that the battery to be detected is unqualified — S71

In response to the proportion of the abnormally glued area being less than or equal to the preset value, determining that the battery to be detected is qualified — S72

Collecting a plurality of original images based on the rays received by the probe — S31

Performing a three-dimensional reconstruction on the plurality of original images to obtain a bottom face detection image for the battery to be detected, the bottom face having a glued region — S32

Determining a detection image for the battery to be detected based on the bottom face detection image — S33

FIG. 12

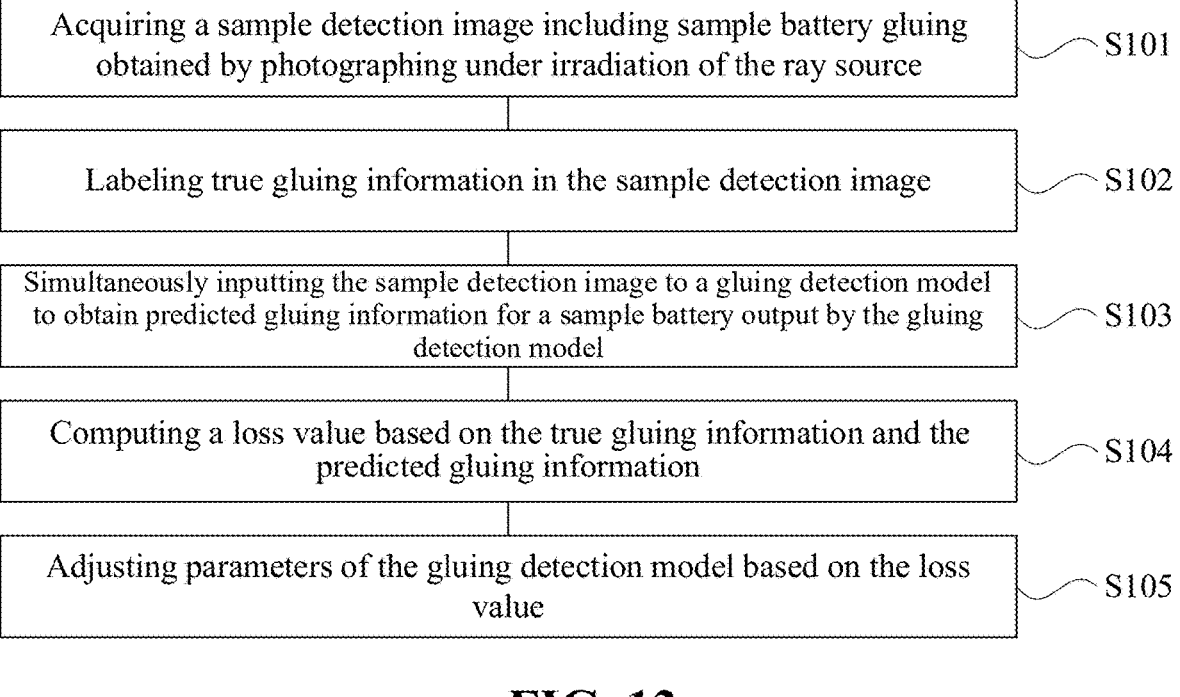

Acquiring a sample detection image including sample battery gluing obtained by photographing under irradiation of the ray source — S101

Labeling true gluing information in the sample detection image — S102

Simultaneously inputting the sample detection image to a gluing detection model to obtain predicted gluing information for a sample battery output by the gluing detection model — S103

Computing a loss value based on the true gluing information and the predicted gluing information — S104

Adjusting parameters of the gluing detection model based on the loss value — S105

Determining a proportion of abnormally glued area of the battery to be detected based on the detection image — S42

Determining the gluing information for the battery to be detected based on the proportion of the abnormally glued area — S43

FIG. 14

DETECTION APPARATUS AND BATTERY PRODUCTION DEVICE

CROSS-REFERENCE

The present application is a continuation of International application PCT/CN2023/143440 filed on Dec. 29, 2023 that claims priority to Chinese Patent Application No. 202310798420.8, filed on Jun. 30, 2023. The content of these applications is incorporated herein by reference in its entirety.

TECHNICAL FIELD

The present application relates to the technical field of batteries, and in particular, to a detection apparatus and a battery production device.

BACKGROUND

With energy saving and emission reduction being the key to the sustainable development of the automobile industry, electric vehicles have become an important part of the sustainable development of automotive industry due to their advantages of energy saving and environmental protection. For electric vehicles, battery technology is an important factor related to their development.

A battery includes a box and a battery cell situated in the box, and the battery cell is bonded to the box via glue. However, due to the influence of mobility of the glue, there may be no full filling between the battery cell and the box. Insufficient gluing amount leads to insufficient bonding strength between the battery cell and the box, affecting the stability of the battery. Therefore, how to detect gluing status for the battery is an urgent problem to be solved.

SUMMARY OF THE INVENTION

The present application is intended to solve at least one of the technical problems present in the Background. To this end, one object of the present application is to provide a detection apparatus and a battery production device to detect gluing status for a battery.

An embodiment of a first aspect of the present application provides a detection apparatus for battery gluing, including: a support frame, including a support arm; a ray source, connected to the support arm; a probe, connected to the support arm, the probe facing an exiting port of the ray source; a carrying platform, located between the ray source and the probe, the carrying platform being used to hold a battery to be detected; where the ray source and the probe are rotatable about a same rotation axis, and a rotation direction of the ray source is the same as that of the probe, such that during rotation, the probe remains facing the exiting port of the ray source and the carrying platform is located between the ray source and the probe.

In the technical solution of the embodiment of the present application, it is possible to subject the battery to be detected to scanning detection via the ray source, the probe and the carrying platform, and to enable the ray source and the probe to rotate about the same rotation axis O, and during rotation, detection may be performed around the battery to be detected, such that the detection is more comprehensive and missed detections may be avoided to a certain extent. After the battery to be detected is subjected to detection, gluing status of the battery to be detected may be acquired according to a detection image, enabling gluing detection for the battery to be detected.

In some embodiments, the support arm includes a C-arm, the ray source is connected to one end of the C-arm, the probe is connected to the other end of the C-arm, and the C-arm is rotatable about the rotation axis. The support arm is provided as the C-arm with the ray source and the probe connected to, respectively, the two fixed ends of the C-arm, and when the C-arm rotates, a relative position of the ray source and the probe does not change, such that during rotation, the probe always remains facing the exiting port of the ray source. The C-arm is controlled to rotate to bring the ray source and the probe in rotation. Since the relative position of the ray source and the probe is fixed, it is only required to rotate the C-arm, and there is no need to consider rotation speed and direction of the ray source and the probe etc. However, for separate control for the ray source and the probe, it is required to consider the rotation speed and direction of the ray source and the probe. That is, the embodiment of the present application provides the C-arm to control the rotation of the ray source and the probe, which provides more convenience.

In some embodiments, the support frame further includes: a support seat; a connecting arm, connected to the support seat, the connecting arm having an arc track, a center of circle of the arc track being located at the rotation axis; where an outer arc surface of the C-arm has a protrusion matching the arc track, and the protrusion is slidably located within the arc track. The support seat and the C-arm are connected via the connecting arm, which not only provides support for the C-arm, but also allows the C-arm to be at a certain height from the ground during normal use, facilitating rotation of the C-arm.

In some embodiments, a rotation angle $\alpha$ of the ray source satisfies: $0°<\alpha\leq90°$. The detection apparatus performs detection on the gluing status of the battery to be detected. A glued region of the battery to be detected is located at the bottom of the battery to be detected. Therefore, upon detection, it is only required to enable rays emitted by the ray source to irradiate the bottom of the battery to be detected, and there is no need to detect the sides of the battery. Furthermore, the rays emitted by the ray source are cone-shaped, a larger area may be covered in a single irradiation for the battery to be detected, and the entire bottom of battery to be detected may be detected with no need for the ray source to rotate at a large angle. Limiting the rotation angle of the ray source to $\alpha\leq90°$ may enable small-angle rotation, which provides more convenience and saves detection time and improves efficiency.

In some embodiments, the carrying platform is movably located between the ray source and the probe, and a moving direction of the carrying platform is perpendicular to an extension direction of the rotation axis. The battery may be continuously detected via moving of the carrying platform, improving the detection efficiency.

In some embodiments, the detection apparatus further includes: a controller, the ray source being electrically and/or communicatively connected to the controller, the probe being electrically and/or communicatively connected to the controller, where the controller is configured for: controlling the ray source and the probe to rotate about the rotation axis; when the ray source rotates, controlling the ray source to emit rays that pass through the battery to be detected located on the carrying platform and are cast to the probe; acquiring a detection image of the battery to be detected based on the rays received by the probe; and determining gluing information for the battery to be detected based on the detection image. Gluing for the battery to be detected may be detected through a method provided in the embodiment of the present application.

In some embodiments, when the support frame includes the support seat and the connecting arm, with the support arm including the C-arm, controlling the ray source and the probe to rotate about the rotation axis includes configuring the controller to control the C-arm to slide within the arc track of the connecting arm. Controlling the C-arm to slide within the arc track of the connecting arm may allow the C-arm to rotate about the rotation axis O, thereby enabling the rotation of the ray source along with the probe.

In some embodiments, controlling the C-arm to slide within the arc track of the connecting arm includes configuring the controller to: control the C-arm to slide in the arc track along a first rotation direction; and control the C-arm to slide in the arc track along a second rotation direction, the first rotation direction being opposite to the second rotation direction. During detection, when the C-arm rotates back and forth, the ray source and the probe are enabled to comprehensively detect the glued region of the bottom face of the battery to be detected.

In some embodiments, the battery to be detected includes the bottom face, the bottom face having the glued region, and the controller is further configured to: control the bottom face of the battery to be detected to fit with a carrying face of the carrying platform. The bottom face of the battery to be detected fits with the carrying face of the carrying platform, such that a state of the battery to be detected during detection may be the same as a state when loaded in a vehicle, and it is possible to avoid, to a certain extent, unforeseen defects such as misalignment of internal structures caused by upright placement or rotation of the battery to be detected, which affects its reliability.

In some embodiments, when the carrying platform is movable along the extension direction perpendicular to the rotation axis, the controller is further configured to: control the carrying platform to move along the extension direction perpendicular to the rotation axis such that the carrying platform is located between the ray source and the probe. The carrying platform is located between the ray source and the probe, such that the rays emitted by the ray source can pass through the battery to be detected located on the carrying platform and be cast onto the probe.

In some embodiments, acquiring the detection image of the battery to be detected based on the rays received by the probe includes configuring the controller to: collect a plurality of original images based on the rays received by the probe; perform a three-dimensional reconstruction on the plurality of original images to obtain a bottom face detection image for the battery to be detected, the bottom face having the glued region; and determine a detection image for the battery to be detected based on the bottom face detection image. With the method described above, it is possible to obtain a clearer detection image and reduce subsequent operations.

In some embodiments, a gluing detection model is stored in the controller, and determining gluing information for the battery to be detected based on the detection image includes configuring the controller to: input the detection image to the gluing detection model to obtain the gluing information for the battery to be detected output by the gluing detection model. The gluing detection model stores therein a variety of gluing types. After the detection image is input to the gluing detection model, the gluing information in the detection image may be quickly identified depending on the stored gluing types.

In some embodiments, a training process for the gluing detection model includes: acquiring a sample detection image including sample battery gluing obtained by photographing under irradiation of the ray source; labeling true gluing information in the sample detection image; simultaneously inputting the sample detection image to the gluing detection model to obtain predicted gluing information for a sample battery output by the gluing detection model; computing a loss value based on the true gluing information and the predicted gluing information; and adjusting parameters of the gluing detection model based on the loss value. Before detecting, it is possible to first define various sizes and types of defective samples to be detected according to detection requirements to manufacture one sample battery, while labeling the true gluing information in the sample battery. Then detection is performed on the sample battery, and comparison is performed with the true gluing information depending on the predicted gluing information for the sample battery output by the gluing detection model, continuously improving the parameters of the gluing detection model such that gluing detection is more accurate.

In some embodiments, determining gluing information for the battery to be detected based on the detection image includes configuring the controller to: determine a proportion of an abnormally glued area of the battery to be detected based on the detection image; and determine the gluing information for the battery to be detected based on the proportion of the abnormally glued area. The proportion of the abnormally glued area is a standard for measuring abnormal gluing of the battery to be detected, and the gluing information for the battery to be detected may be determined depending on the proportion of the abnormally glued area.

In some embodiments, the controller is further configured to: in response to the proportion of the abnormally glued area being greater than a preset value, determine that the battery to be detected is unqualified. When the proportion of the abnormally glued area is greater than the preset value, it indicates that gluing for the battery to be detected is unqualified, which affects the stability of the battery to be detected, and that the battery to be detected is determined to be unqualified.

In some embodiments, the preset value is greater than or equal to 10%, and less than or equal to 25%. During production of the battery, it is difficult that gluing is completed without defects. If the preset value is set to be too small, for example, less than 10%, it may be possible that too many batteries are identified as being unqualified, affecting battery yield. If the preset value is set to be too large, for example, greater than 25%, it may be possible that the battery has a large abnormally glued area, affecting the reliability of the battery. Setting the preset value to be greater than or equal to 10%, and less than or equal to 25% may improve the reliability of the battery while ensuring the battery yield to a certain extent.

An embodiment of a second aspect of the present application further provides a battery production device, including a detection apparatus according to the above embodiments.

The above description is only an overview of the technical solution of the present application. In order to more clearly understand the technical means of the present application to implement same according to the contents of the Specification, and in order to enable the above and other objectives, features, and advantages of the present application to be more obvious and understandable, Detailed Description of the present application is hereby exemplarily described below.

DESCRIPTION OF DRAWINGS

In the drawings, unless otherwise specified, like reference numerals indicate like or similar parts or elements throughout multiple drawings. These drawings are not necessarily drawn to scale. It should be understood that these accompanying drawings depict only some implementations disclosed in accordance with the present application and should not be considered as limiting the scope of the present application.

FIG. 8 is a block diagram of a detection apparatus according to some embodiments of the present application;

FIG. 9 is a control flowchart of a controller according to some embodiments of the present application;

FIG. 10 is a control flowchart of a controller according to some embodiments of the present application;

FIG. 11 is a control flowchart of a controller according to some embodiments of the present application;

FIG. 12 is a control flowchart of a controller according to some embodiments of the present application;

FIG. 13 is a training flowchart of a gluing detection model according to some embodiments of the present application;

FIG. 14 is a control flowchart of a controller according to some embodiments of the present application.

DETAILED DESCRIPTION

Figure 1:
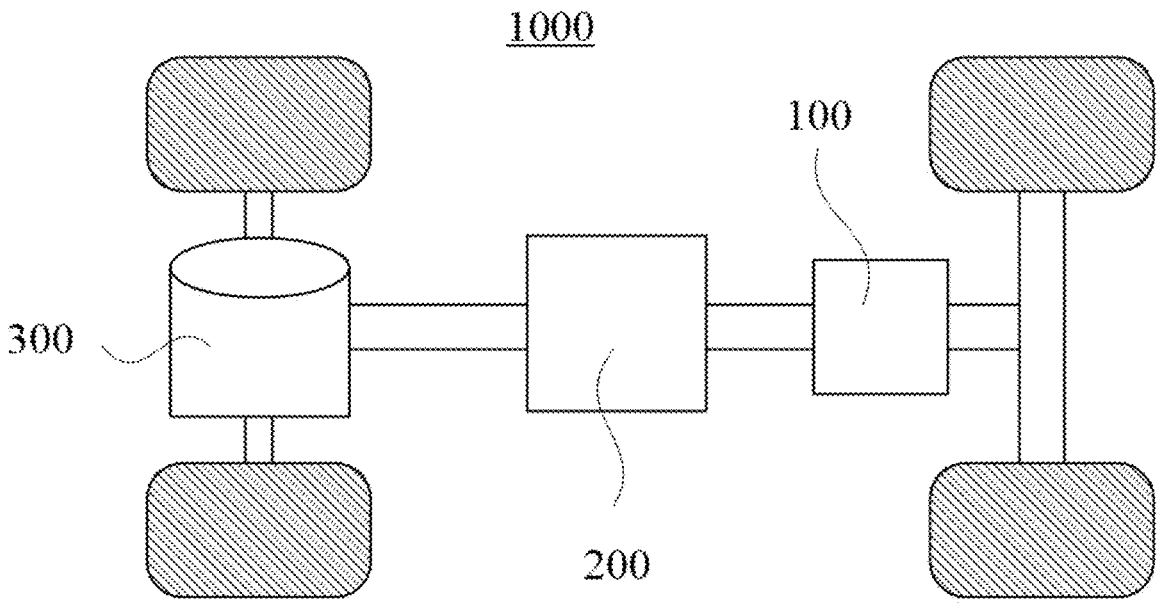
FIG. 1 is a schematic structural diagram of a vehicle provided in some embodiments of the present application.

Embodiments of the technical solutions of the present application will be described in detail below with reference to the accompanying drawings. The following embodiments are only used to more clearly illustrate the technical solutions of the present application, therefore only as examples, and cannot be used to limit the scope of protection of the present application.

Unless otherwise defined, all technical and scientific terms used herein have the same meanings as those commonly understood by those skilled in the art to which the present application pertains to. The terms used herein are for the purpose of describing specific embodiments only and are not intended to limit the present application. The terms "including" and "having" and any variations thereof in the specification and claims of the present application and the aforementioned BRIEF DESCRIPTION OF DRAWINGS are intended to cover non-exclusive inclusion.

In the description of the embodiments of the present application, the technical terms "first", "second", etc., are used only to distinguish between different objects and are not to be understood as indicating or implying a relative importance or implicitly specifying the number, particular order, or primary and secondary relationship of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may represent three situations: A exists alone, both A and B exist, and B exists alone. Moreover, the character "/" herein generally indicates that the context objects are in an "or" relationship.

In the description of the embodiments of the present application, the term "a plurality of" refers to more than two (including two), and similarly, "a plurality of groups" refers to more than two groups (including two groups); and "a plurality of sheets" refers to more than two sheets (including two sheets).

In the description of the embodiments of the present application, the orientation or positional relationships indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or positional relationships shown in the accompanying drawings, and are only for convenience of description of the present application and simplification of the description, rather than indicating or implying that the indicated apparatus or element must have a specific orientation, be constructed and operate in a specific orientation, and therefore, cannot be understood as a limitation to the present application.

In the description of the embodiments of the present application, unless otherwise specified and limited, the technical terms "mounting", "connection", "connection", and "fixation" should be understood in a broad sense, for example, they can be fixed connection, detachable connection, or integration; or they can be mechanical connection or electrical connection; or they can be direct connection, indirect connection through an intermediate medium, or communication of the interiors of two elements or the relationship of interaction between two elements. For those of ordinary skill in the art, the specific meanings of the above terms in the embodiments of the present application can be understood according to specific situations.

At present, from the perspective of the development of the market situation, power batteries are increasingly more widely used. Power batteries are not only applied in energy storage power source systems such as water, fire, wind and solar power stations, but also widely applied in electric transport tools, such as electric bicycles, electric motorcycles, and electric vehicles, as well as many fields, such as military equipment and aerospace. With continuous expansion of the application fields of the power batteries, the market demand therefor is also constantly expanding.

With increasing requirements for battery energy density, CTP (Cell to Pack) batteries are increasingly applied. CTP integrates battery cells directly into a battery, with the intermediate state of modules removed, which allows for reduction in the weight and volume of the battery, thereby increasing the battery's energy density. The battery cell is fixedly connected to a box of the battery via a glue. Due to a difference in glue mobility, it may be caused that air in the box is not exhausted in time during gluing, and that the glue slowly fills air cavities, producing bubbles, or the incoming glue comes with bubbles. The lack of the glue in the bubble region causes the battery cell to directly contact the box, posing a short circuit risk. Furthermore, an insufficient gluing amount results in an insufficient bonding strength between the battery cell and the box. When the battery vibrates, it is easily caused that the battery cell is detached from the box, affecting the reliability of the battery.

In the related art, ultrasonic technology is employed to detect batteries, but some of the batteries have a water cooling conduit at the bottom and cannot be detected with the ultrasonic technology.

For one detection apparatus provided in the embodiment of the present application, detection of a battery is achieved by emitting rays by the ray source that pass through the battery placed on the carrying platform and are cast onto the probe. Furthermore, the ray source and the probe are rotated such that the ray source and the probe can provide detection for the entire battery while rotating, thereby enabling non-destructive detection of the gluing status of the battery.

The detection apparatus and the battery production device disclosed in the embodiments of the present application may be used for battery production and manufacturing phases, and the detected and produced battery may be used, without limitation, in an electrical apparatus, such as a vehicle, a ship, or an aircraft. The battery disclosed in the present application may be used to form a power supply system for the electrical apparatus.

An embodiment of the present application provides an electrical apparatus with a battery used as a power source. The electrical apparatus may be, but is not limited to, a mobile phone, a tablet, a laptop, an electric toy, an electric tool, a storage battery car, an electric vehicle, a ship, a spacecraft, etc. The electric toy may include fixed or mobile electric toys, such as game consoles, electric vehicle toys, electric ship toys, and electric airplane toys. The spacecraft may include airplanes, rockets, space shuttles, spaceships, etc.

For the convenience of description in the following embodiments, an electrical apparatus being a vehicle 1000 according to an embodiment of the present application is taken as an example for the description.

Referring to FIG. 1, FIG. 1 is a structural schematic view of a vehicle provided in some embodiments of the present application. The vehicle 1000 may be a fuel vehicle, a gas vehicle or a new energy vehicle. The new energy vehicle may be an all-electric vehicle, a hybrid vehicle, an extended-range vehicle, or the like. A battery 100 is provided inside the vehicle 1000. The battery 100 may be provided at the bottom, or head, or tail of the vehicle 1000. The battery 100 may be used as a power supply for the vehicle 1000, for example, the battery 100 may be used as an operating power source for the vehicle 1000. The vehicle 1000 may further include a controller 200 and a motor 300. The controller 200 is configured to control the battery 100 to supply power to the motor 300, for example, to supply power for starting, navigation and driving of the vehicle 1000.

In some embodiments of the present application, the battery 100 may not only be used as the operating power source for the vehicle 1000, but also as a driving power source for the vehicle 1000, to replace or partially replace fuel or natural gas to provide driving power for the vehicle 1000.

Figure 2:
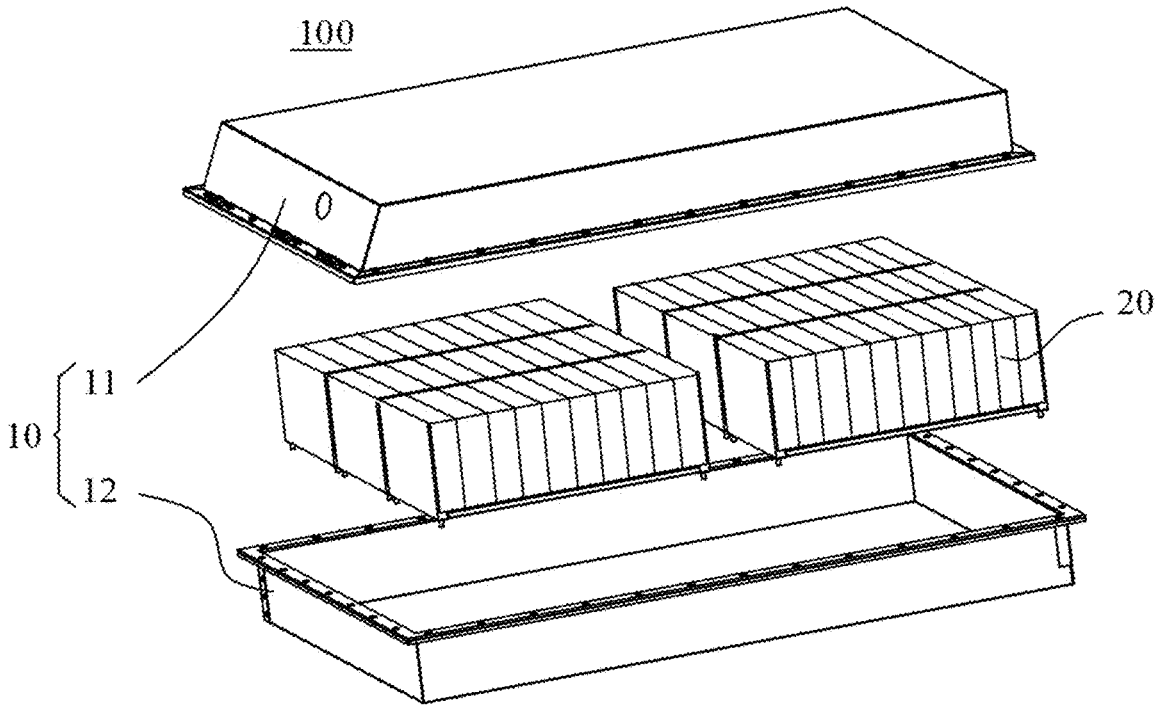
FIG. 2 is an exploded view of a battery provided in some embodiments of the present application.

Referring to FIG. 2, FIG. 2 is an exploded view of a battery provided in some embodiments of the present application. The battery 100 comprises a box 10 and a battery cell 20, wherein the battery cell 20 is accommodated in the box 10. The box 10 is used to provide an accommodating space for the battery cell 20, and the box 10 can be of various structures. In some embodiments, the box 10 may include a first portion 11 and a second portion 12, the first portion 11 and the second portion 12 covering each other, and the first portion 11 and the second portion 12 together defining the accommodating space for accommodating the battery cell 20. The second portion 12 may be of a hollow structure with an opening at one end, and the first portion 11 may be of a plate-like structure, where the first portion 11 covers the opening side of the second portion 12 so that the first portion 11 and the second portion 12 together define the accommodation space. The first portion 11 and the second portion 12 may each be of a hollow structure with an opening at one end, where the opening side of the first portion 11 covers the opening side of the second portion 12. Of course, the box 10 formed by the first portion 11 and the second portion 12 may be of a variety of shapes, such as a cylinder and a rectangular solid.

In the battery 100, there may be a plurality of battery cells 20, and the plurality of battery cells 20 may be connected in series or in parallel or in parallel-series, where the parallel-series connection means that the plurality of battery cells 20 are connected in both series and parallel. The plurality of battery cells 20 may be directly connected together in series or in parallel or in parallel-series, and then the whole composed of the plurality of battery cells 20 may be accommodated in the box 10. Of course, the battery 100 may also be in the form of a battery module first formed by the plurality of battery cells 20 being connected in series or in parallel or in parallel-series, then the plurality of battery modules may be connected in series or in parallel or in parallel-series to form a whole, and accommodated in the box 10. The battery 100 may further include other structures, for example, the battery 100 may further include a bus component configured to realize electrical connections between the plurality of battery cells 20.

Each battery cell 20 may be a secondary battery or a primary battery; or it may be a lithium-sulfur battery, a sodium-ion battery or a magnesium-ion battery, but is not limited thereto. The battery cell 20 may be in cylindrical, flat, cuboid shape, or in other shapes, or the like.

Figure 3:
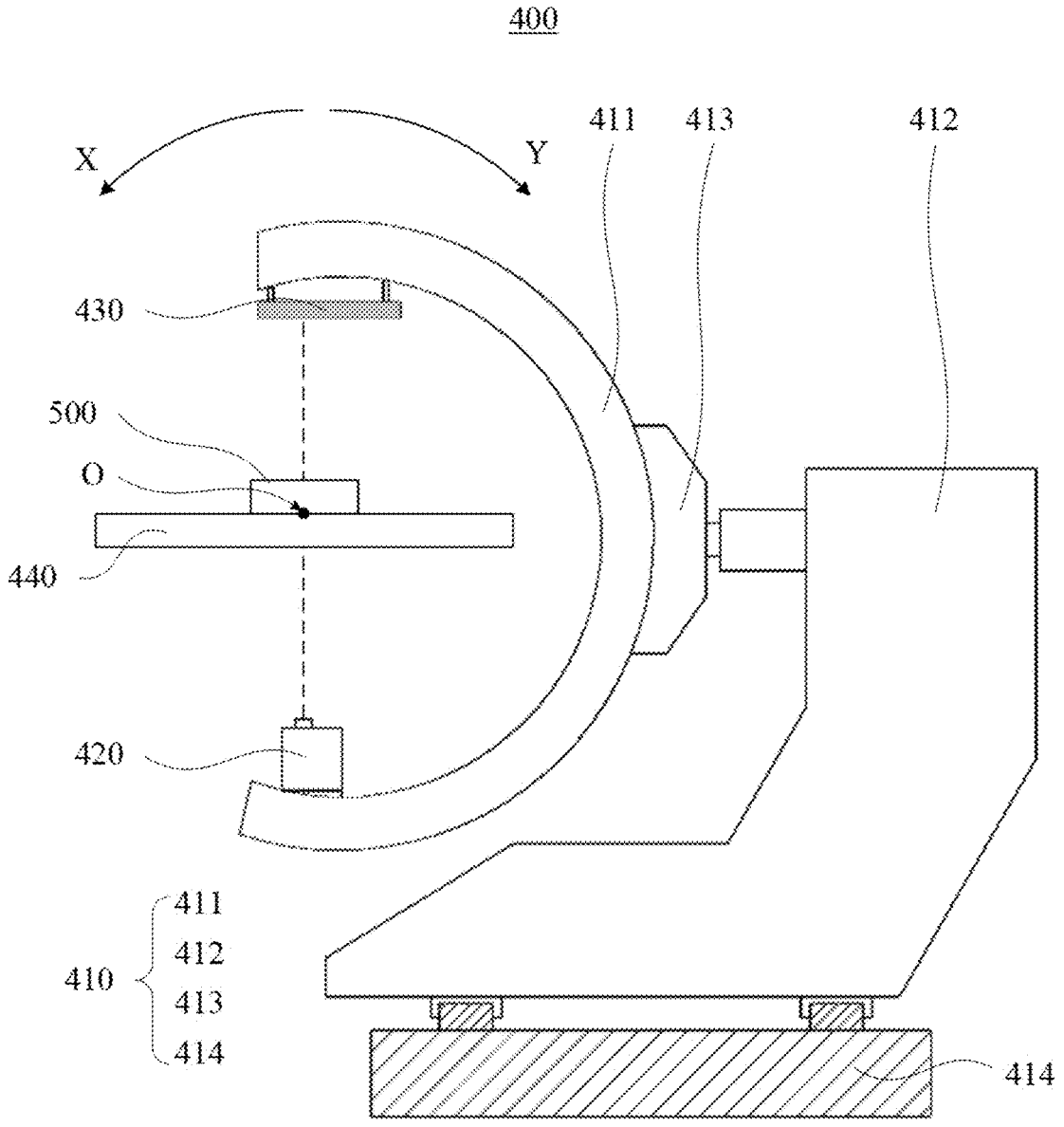
FIG. 3 is a front view of a detection apparatus according to some embodiments of the present application.

An embodiment of the present application provides a detection apparatus for detecting battery gluing, and FIG. 3 is a front view of a detection apparatus according to some embodiments of the present application. Referring to FIG. 3, the detection apparatus 400 includes a support frame 410, a ray source 420, a probe 430, and a carrying platform 440. The support frame 410 includes a support arm 411, the ray source 420 and the probe 430 are both connected to the support arm 411, with the probe 430 facing an exiting port of the ray source 420, and the carrying platform 440 is located between the ray source 420 and the probe 430, where the ray source 420 and the probe 430 are rotatable about a same rotation axis O, and a rotation direction of the ray source 420 is the same as that of the probe 430, such that during rotation, the probe 430 remains facing the exiting port of the ray source 420 and the carrying platform 440 is located between the ray source 420 and the probe 430. For the convenience of explanation and description, FIG. 3 also shows a battery to be detected 500, and the carrying platform 440 is used to hold the battery to be detected 500.

The support frame 410 may be any component for mounting the ray source 420 and the probe 430 to improve the stability of the ray source 420 and the probe 430. The support arm 411 is used to fix the ray source 420 and the probe 430. After the ray source 420 and the probe 430 are mounted on the support arm 411, the probe 430 can face the exiting port of the ray source 420, and in this way, rays emitted by the ray source 420 can pass through the battery to be detected 500 on the carrying platform 440 and be cast onto the probe 430, allowing for detection of the battery to be detected 500.

The ray source 420 is an apparatus for emitting detection rays, which mainly includes a ray tube and a corresponding power supply. The detection rays may be X-rays or other rays. The ray tube may emit corresponding detection rays, e.g. an X-ray tube or a gamma-ray tube. The ray source 420 may be open (open tube) or closed (closed tube). In one example, the ray source 420 is an X-ray source, and the detection rays emitted thereby are X-rays. When the detection rays emitted by the ray source 420 pass through the battery to be detected 500, since the different glued regions of the battery to be detected 500 are different in thickness and varied in an absorption rate for X-rays, gluing detection may be performed via the different absorption degrees thereof for X-rays.

The rays emitted by the ray source 420 are all penetrative, and materials of different thicknesses attenuate the rays to different degrees, such that different amounts of rays are detected by the probe 430. There is a layer of ray-luminescent material inside the probe 430, which may emit a visible light signal under stimulation by rays. The visible light signal is transmitted to a photoelectric converter to form an electrical signal, and then a digital signal is output via an internal electrical signal transmission circuit, representing an image with light and dark contrast thereon. There will be a certain attenuation to the rays after transmitting through a detected object. The more rays that pass through, the more luminescent signals a photosensitive material emits, represented as a brighter region on a final image. Conversely, the fewer rays that pass through, the darker this region is on the image. The probe 430 may be a flat panel probe or a linear array probe, which is not limited in the embodiments of the present application.

The carrying platform 440 may be an arbitrary carrying structure, such as a pallet, a gripping claw, etc. that may fix the battery to be detected 500 in a bearing or clamping manner. The carrying platform 440 may be fixed or movable, e.g. a pallet or a clamping mechanism provided with a conveying track and moving along the conveying track. There may be one or a plurality of batteries to be detected 500 carried on the carrying platform 440. In one example, the carrying platform 440 may include a plurality of pallets, each pallet carrying one or more batteries to be detected 500. The battery to be detected 500 may be the battery 100 including a plurality of battery cells 20.

In an embodiment of the present application, a bearing capacity of the carrying platform 440 is greater than a weight of the battery to be detected 500 placed thereon.

In an embodiment of the present application, the thicknesses of regions of the carrying platform 440 are equal, which reduces the impact on detection results.

In an embodiment of the present application, the ray source 420 and the probe 430 are rotatable about the same rotation axis O, and the support arm 411 rotates so as to bring the ray source 420 and the probe 430 in rotation.

Figure 4:
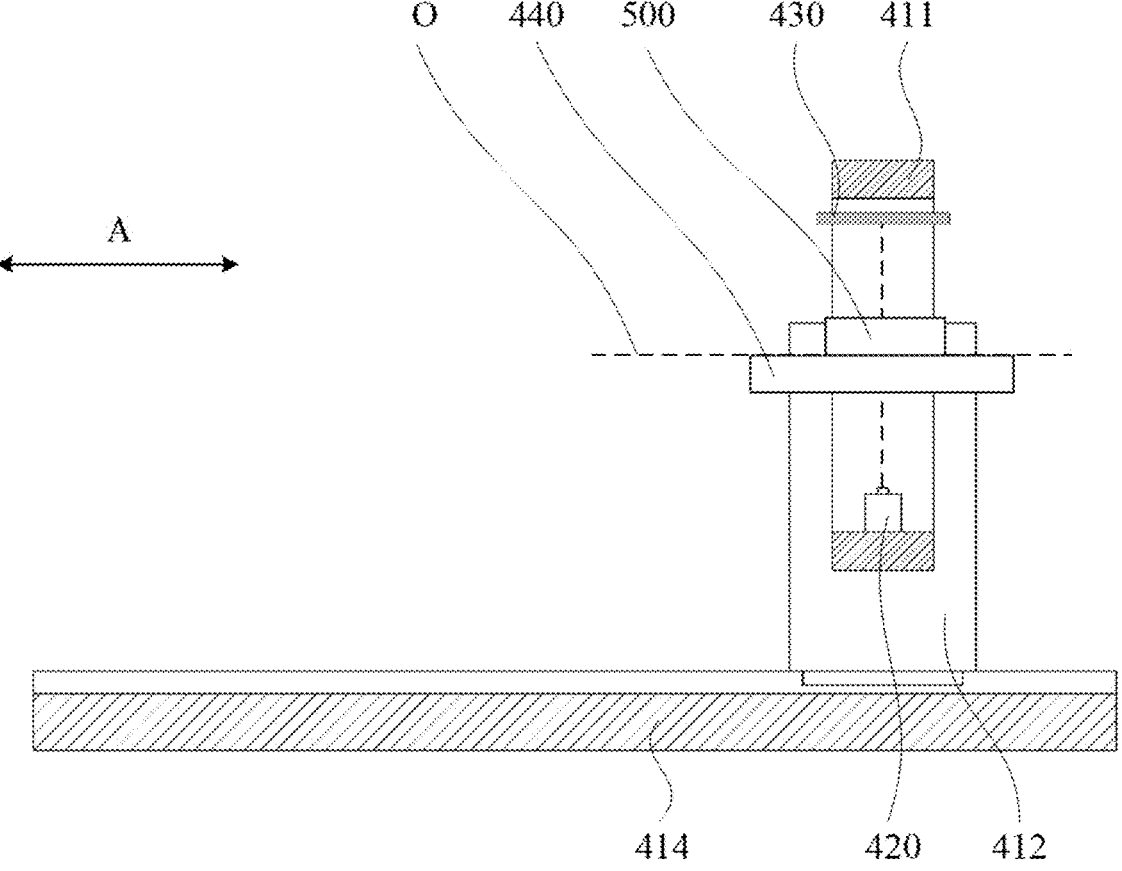
FIG. 4 is a left view of a detection apparatus according to some embodiments of the present application.

In an embodiment of the present application, when the ray source 420 and the probe 430 rotate, it is necessary to ensure that the carrying platform 440 is located between the ray source 420 and the probe 430, such that upon detection, rays emitted by the ray source 420 can pass through the battery to be detected 500 on the carrying platform 440 and be cast onto the probe 430. Exemplarily, FIG. 4 is a left view of a detection apparatus according to some embodiments of the present application. In conjunction with FIGS. 3 and 4, the rotation axis O may be located on a carrying face of the carrying platform 440, such that, when the ray source 420 and the probe 430 rotate, the carrying platform 440 may be always located between the ray source 420 and the probe 430. The ray source 420 and the probe 430 may rotate clockwise or counterclockwise.

The rotation axis O is one virtual line, not a real line. In FIG. 3, the rotation axis O is in a direction perpendicular to the plane in the figure, so in FIG. 3, the rotation axis O is replaced by a dot.

For the detection apparatus provided in the embodiment of the present application, it is possible to subject the battery to be detected 500 to scanning detection via the ray source 420, the probe 430, and the carrying platform 440, and to enable the ray source 420 and the probe 430 to rotate about the same rotation axis O, and during rotation, detection may be performed around the battery to be detected 500 by the ray source 420 and the probe 430, such that the detection is more comprehensive and missed detections may be avoided to a certain extent. After the battery to be detected 500 is subjected to detection, gluing status of the battery to be detected 500 may be acquired according to a detection image, enabling gluing detection for the battery to be detected 500.

When the detection apparatus provided in the embodiment of the present application performs detection on the battery to be detected 500, there is no need to disassemble the battery to be detected 500, and non-destructive detection of the gluing status of the battery to be detected 500 may be achieved.

According to some embodiments of the present application, referring to FIG. 3, the support arm 411 includes a C-arm, the ray source 420 is connected to one end of the C-arm, the probe 430 is connected to the other end of the C-arm, and the C-arm is rotatable about the rotation axis O.

The profile of the C-arm is similar to the English letter C, both ends of the C-arm are fixed ends, and the ray source 420 and the probe 430 are, respectively, connected to the two fixed ends of the C-arm.

In an embodiment of the present application, the support arm 411 is provided as the C-arm with the ray source 420 and the probe 430 connected to, respectively, the two fixed ends of the C-arm, and when the C-arm rotates, a relative position of the ray source 420 and the probe 430 does not change, such that during rotation, the probe 430 always remains facing the exiting port of the ray source 420. The C-arm is controlled to rotate to bring the ray source 420 and the probe 430 in rotation. Since the relative position of the ray source 420 and the probe 430 is fixed, it is only required to rotate the C-arm, and there is no need to consider rotation speed and direction of the ray source 420 and the probe 430 etc. That is, the embodiment of the present application provides the C-arm to control the rotation of the ray source 420 and the probe 430, which provides more convenience.

Figure 5:
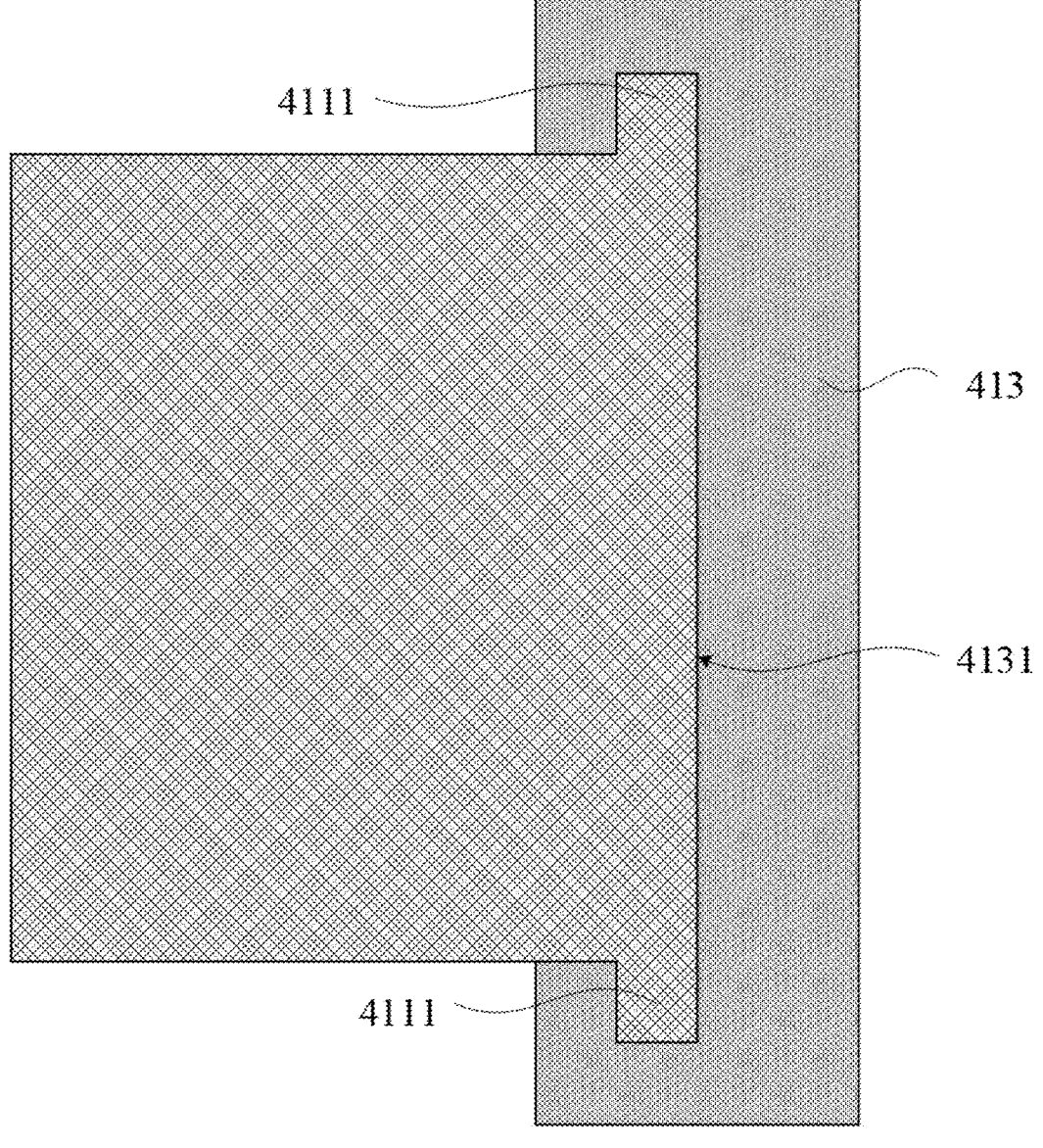
FIG. 5 is a cross-sectional view of connected connecting arm and C-arm according to some embodiments of the present application.

According to some embodiments of the present application, referring to FIG. 3 and FIG. 4, the support frame 410 further includes a support seat 412 and a connecting arm 413, and the connecting arm 413 is connected to the support seat 412. FIG. 5 is a cross-sectional view of connected connecting arm and C-arm according to some embodiments of the present application. In conjunction with FIG. 3 and FIG. 5, the connecting arm 413 has an arc track 4131, and a center of circle of the arc track 4131 is located at the rotation axis O. An outer arc surface of the C-arm has a protrusion 4111 matching the arc track 4131, and the protrusion 4111 is slidably located within the arc track 4131. It should be noted that the simplified cross-sectional view shown in FIG. 5 represents only a connection relationship between the connecting arm and the C-arm, and what is seen in the cross-sectional view shown in FIG. 5 is a cross-section of the arc track 4131, so it cannot be seen that the arc track 4131 is arc-shaped.

In an embodiment of the present application, the support seat 412 provides support for the C-arm, and allows the C-arm to be at a certain height from the ground during normal use, facilitating the rotation of the C-arm. As shown in FIG. 3, the shape of the support seat 412 may be an L-shape with a bend, and in this way, a portion of the C-arm may be placed at a groove of the L-shaped support seat 412, which may save mounting space and facilitate the miniaturized design of the detection apparatus 400.

The connecting arm 413 connects the C-arm and the support seat 412, enabling the support seat 412 to provide support for the C-arm.

With reference to FIG. 5, the cross-section of the arc track 4131 is T-shaped, the protrusion 4111 on the C-arm and a main body of the C-arm are also T-shaped, and the C-arm is less prone to detaching after being connected to the connecting arm 413. Since the center of circle of the arc track 4131 is located at the rotation axis O, a portion of a sliding trajectory of the C-arm coincides with the arc track 4131, such that the C-arm rotates along the rotation axis O.

In some embodiments of the present application, the connecting arm 413 has a gear thereon, a center line of the gear is parallel to the rotation axis O of the C-arm, an outer surface of the C-arm has thereon rotation teeth meshing with the gear, and when rotating, the gear may drive rotation of the C-arm. In other implementations, the C-arm may also be rotated in other ways, which is not limited in the embodiments of the present application.

Referring to FIG. 3 and FIG. 4, in some embodiments of the present application, the support frame 410 may further include a base 414, and the base 414 is connected to the support seat 412 via a sliding guide rail, such that the support seat 412 is movable; a moving direction of the support seat 412 is parallel to an extension direction A of the rotation axis O, and by regulating movement of the support seat 412, it is possible, during the detection, to allow the ray source 420 and the probe 430 to face different regions of the battery to be detected 500, achieving detection. The base 414 provides stability for the entire detection apparatus.

According to the embodiment of the present application, the support seat 412 and the C-arm are connected via the connecting arm 413, which not only provides support for the C-arm, but also allows the C-arm to be at a certain height from the ground during normal use, facilitating rotation of the C-arm.

According to some embodiments of the present application, a rotation angle α of the ray source 420 satisfies: 0°<α≤90°.

Figure 6:
FIG. 6 is a front view of a detection apparatus in another state, according to some embodiments of the present application.
Figure 7:
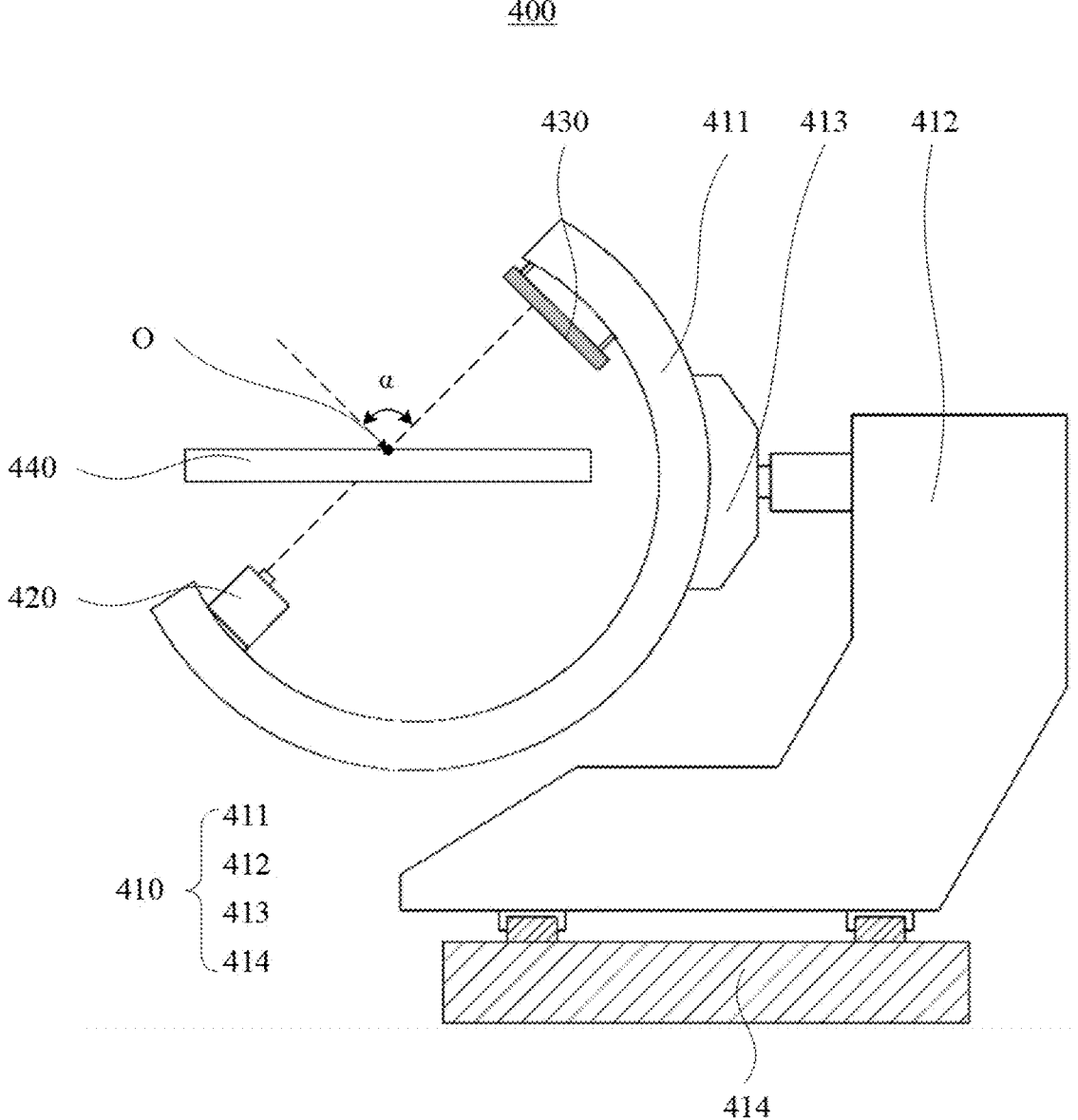
FIG. 7 is a front view of a detection apparatus in another state, according to some embodiments of the present application.

FIG. 6 is a front view of a detection apparatus in another state, according to some embodiments of the present application. FIG. 7 is a front view of a detection apparatus in another state, according to some embodiments of the present application. After the C-arm in the detection apparatus shown in FIG. 3 is rotated at a certain angle along a first rotation direction X, the detection apparatus shown in FIG. 6 is obtained, and after the C-arm in the detection apparatus shown in FIG. 3 is rotated at a certain angle along a second rotation direction Y, the detection apparatus shown in FIG. 7 is obtained. It should be noted that, in FIG. 6 and FIG. 7, in order to clearly show the structure of the detection apparatus, the battery to be detected 500 is omitted in FIG. 6 and FIG. 7.

In an embodiment of the present application, since the C-arm may be rotated back and forth, that is, the ray source 420 may be rotated in two opposite rotation directions, the rotation angle α of the ray source 420 in the embodiment of the present application refers to an angle α between two maximum positions when the ray source 420 is rotated to these two maximum positions along the two opposite rotation directions during detection, that is, a maximum angle of rotation of the ray source 420 during detection is not a maximum angle at which the ray source 420 itself can be rotated.

The detection apparatus according to the embodiment of the present application performs detection on the gluing status of the battery to be detected 500. A glued region of the battery to be detected 500 is located at the bottom of the battery to be detected 500. Therefore, upon detection, it is only required to enable rays emitted by the ray source 420 to irradiate the bottom of the battery to be detected 500, and there is no need to detect the sides of the battery. Furthermore, the rays emitted by the ray source 420 are cone-shaped, a larger area may be covered in a single irradiation for the battery to be detected 500, and the entire bottom of the battery to be detected 500 may be detected with no need for the ray source 420 to rotate at a large angle. Limiting the rotation angle of the ray source 420 to α≤90° may enable small-angle rotation, which provides more convenience and saves detection time and improves efficiency.

Furthermore, upon detection, the rays emitted by the ray source 420 do not need to penetrate two opposite side faces of the battery to be detected 500, which allows for reduction in penetration thickness.

According to some embodiments of the present application, the carrying platform 440 is movably located between the ray source 420 and the probe 430, and a moving direction of the carrying platform 440 is perpendicular to an extension direction A of the rotation axis O.

In other implementations of the present application, the carrying platform 440 may be connected to a conveyor belt, or the carrying platform 440 may be connected to an annular guide rail, etc.

Exemplarily, when the carrying platform 440 is connected to the annular guide rail, a pallet on the annular guide rail may be made of carbon fiber material, allowing for reduction in the impact on detection.

The detection apparatus provided in the embodiment of the present application may be put subsequent to a procedure that battery manufacturing is completed. The manufactured battery is directly transported to the carrying platform 440 via the annular guide rail to enter space between the ray source 420 and the probe 430 for detection, and is transported to the annular guide rail via the carrying platform 440 to enter a next phase after detection is completed. In other implementations, the battery to be detected 500 may be moved onto the carrying platform 440 via a mechanical gripper or a crane.

The moving direction of the carrying platform 440 is perpendicular to the extension direction A of the rotation axis O, such that portions of the battery may be detected.

The carrying platform 440 according to the embodiment of the present application is movably located between the ray source 420 and the probe 430, and continuous detection of the battery may be achieved by moving the carrying platform 440, improving the detection efficiency.

According to some embodiments of the present application, FIG. 8 is a block diagram of a detection apparatus according to some embodiments of the present application. Referring to FIG. 8, the detection apparatus further includes a controller 450, the ray source 420 is electrically and/or communicatively connected to the controller 450, and the probe 430 is electrically and/or communicatively connected to the controller 450.

FIG. 9 is a control flowchart of a controller according to some embodiments of the present application. Referring to FIG. 9, the controller is configured for:

in step S10, controlling a ray source and a probe to rotate about a rotation axis;

in step S20, when the ray source rotates, controlling the ray source to emit rays that pass through a battery to be detected on a carrying platform and are cast to the probe;

in step S30, acquiring a detection image of the battery to be detected based on the rays received by the probe;

and in step S40, determining gluing information for the battery to be detected based on the detection image.

According to some embodiments of the present application, the controller 450 may include a memory and a processor, the memory is used to store instructions, and the processor is used to read the instructions and execute a command depending on the instructions.

In an embodiment of the present application, the probe 430 may be calibrated before detection commences, to reduce an error in the detection image. Exemplarily, it is required to calibrate the probe 430 before formal running. Before calibration, it is required to ensure that there is no clutter at the exiting port of the ray source 420 and on the surface of the probe 430, and there is no obstruction between the ray source 420 and the probe 430. The rays are required to fully cover a receiving face of the probe 430. A grayscale value of imaging of the detection apparatus at this moment may be adjusted to a calibration grayscale value.

Exemplarily, when the detection apparatus is used to perform detection on the battery to be detected 500, the battery to be detected 500 may be placed on the carrying platform 440 such that a large face of the battery to be detected 500 fits with a carrying face of the carrying platform 440, that is, a thickness direction of the battery to be detected 500 is perpendicular to the carrying face, and then the battery to be detected 500 may be detected using the ray source 420 and the probe 430.

In an embodiment of the present application, the gluing information for the battery to be detected 500 may be used to indicate whether gluing for the battery to be detected 500 is qualified.

In the embodiment of the present application, if there is a region of the glued region of the battery to be detected 500 that is not filled with glue, a grayscale change occurs to the detection image; the gluing information for the battery to be detected 500 may be determined depending on the grayscale change of the detection image.

Gluing for the battery to be detected 500 may be detected through the method provided in the embodiment of the present application, enabling automatic detection.

In some embodiments of the present application, when the support frame 410 includes a support seat 412 and a connecting arm 413 and the support arm 411 includes a C-arm, step S10 includes configuring the controller to:

in step S11, control the C-arm to slide within an arc track of the connecting arm.

Controlling the C-arm to slide within the arc track 4131 of the connecting arm 413 may allow the C-arm to rotate about the rotation axis O, thereby enabling the rotation of the ray source 420 along with the probe 430.

In some embodiments of the present application, the support frame 410 may be electrically and/or communicatively connected to the controller 450, allowing the controller 450 to control the C-arm to slide within the arc track 4131 of the connecting arm 413.

According to some embodiments of the present application, FIG. 10 is a control flowchart of a controller according to some embodiments of the present application. Referring to FIG. 10, step S11 includes configuring the controller to:

in step S111, control the C-arm to slide in the arc track along a first rotation direction;

and in step S112, control the C-arm to slide in the arc track along a second rotation direction, the first rotation direction being opposite to the second rotation direction.

In conjunction with FIGS. 3, 6, and 7, in some embodiments of the present application, at the beginning of the detection, a state of the detection apparatus is as shown in FIG. 3. When the detection commences, the C-arm in the detection apparatus shown in FIG. 3 is first controlled to rotate at a certain angle along the first rotation direction X, and during the rotation, a detection image is collected at a certain frequency until the C-arm rotates to the state of the detection apparatus shown in FIG. 6. Then, the C-arm in the detection apparatus shown in FIG. 6 is controlled to rotate along the second rotation direction Y to the state of the detection apparatus shown in FIG. 3. Next, the C-arm in the detection apparatus shown in FIG. 3 is controlled to rotate at a certain angle along the second rotation direction Y, and during the rotation, a detection image is collected at a certain frequency until the C-arm rotates to the state of the detection apparatus shown in FIG. 7.

The detection process described above is explained by taking the example of first rotating to the state of the detection apparatus shown in FIG. 6 and then rotating to the state of the detection apparatus shown in FIG. 7. In other implementations, it may be the case of first rotating to the state of the detection apparatus shown in FIG. 7 and then rotating to the state of the detection apparatus shown in FIG. 6, or another case, which is not limited in the present application.

During the detection, the C-arm is rotated back and forth, and the support seat 412 is moved along the extension direction A of the rotation axis O, such that the ray source 420 and the probe 430 can fully detect the glued region of the bottom face of the battery to be detected 500.

According to some embodiments of the present application, the battery to be detected 500 includes the bottom face, the bottom face has the glued region, and FIG. 11 is a control flow chart of a controller according to some embodiments of the present application. Referring to FIG. 11, the controller is further configured to:

in step S50, control the bottom face of the battery to be detected to fit with the carrying face of the carrying platform.

The shape of the battery to be detected 500 is similar to a cuboid, and the battery to be detected 500 has two large faces provided oppositely and four side faces connecting the two large faces. The large faces are the top and bottom faces of the battery to be detected, where the top and bottom faces are located at the first portion 11 and the second portion 12 of the box 10 described above, respectively. The bottom face has the glued region, and the glued region has a glue for bonding a battery cell. For example, the bottom face is located at the second portion 12, and then the second portion 12 has the glued region.

In an embodiment of the present application, the bottom face of the battery to be detected 500 fits with the carrying face of the carrying platform, such that a state of the battery to be detected 500 during detection may be the same as a state when loaded in a vehicle, and it is possible to avoid, to a certain extent, unforeseen defects such as misalignment of internal structures caused by upright placement or rotation of the battery to be detected 500, which affects its reliability.

According to some embodiments of the present application, when the carrying platform 440 is movable along the extension direction A perpendicular to the rotation axis O, referring to FIG. 11, the controller is further configured to:

in step S60, control the carrying platform to move along the extension direction perpendicular to the rotation axis such that the carrying platform is located between the ray source and the probe.

The carrying platform 440 is located between the ray source 420 and the probe 430, such that the rays emitted by the ray source 420 can pass through the battery to be detected located on the carrying platform 440 and be cast onto the probe 430.

In some embodiments of the present application, the carrying platform 440 may be electrically and/or communicatively connected to the controller 450, allowing the controller 450 to control movement of the carrying platform 440.

According to some embodiments of the present application, FIG. 12 is a control flowchart of a controller according to some embodiments of the present application. Referring to FIG. 12, step S30 includes configuring the controller to:

in step S31, collecting a plurality of original images based on the rays received by the probe;

in step S32, perform a three-dimensional reconstruction on the plurality of original images to obtain a bottom face detection image for the battery to be detected, the bottom face having the glued region;

and in step S33, determining a detection image for the battery to be detected based on the bottom face detection image.

In an embodiment of the present application, the original image is an unprocessed image, and the battery to be detected 500 in the image at this moment is not clear enough. After the plurality of original images are processed, the battery to be detected 500 in the image is clearer, and it is easier to identify a gluing status of the battery to be detected 500.

Since the plurality of original images are collected during rotation of the ray source 420 and the probe 430, an image for the entire battery to be detected 500 may be obtained by performing a three-dimensional reconstruction on the plurality of original images. However, the present application only needs to detect the bottom face of the battery to be detected 500, only extracts the bottom face detection image for the bottom face of the battery to be detected 500, has no need to detect the entire battery to be detected 500, reducing subsequent operations.

In an embodiment of the present application, with the method described above, it is possible to obtain a clearer detection image and reduce subsequent operations.

In the embodiment of the present application, the number of the collected plurality of original images for the battery to be detected 500 may be set as required. For example, 720 original images may be collected.

In an embodiment of the present application, after one region of the battery to be detected 500 is detected, the support seat 412 may be controlled to move such that the ray source 420 and the probe 430 face other regions of the battery to be detected 500 for detection.

In an embodiment of the present application, target region capturing may be performed on the bottom face detection image to capture a required region and crop a surrounding information-free region, improving image processing efficiency and reducing image storage size. Then a contrast enhancement is performed on the image to enhance a grayscale contrast in the image and highlight a region with abnormal glued area in the image to obtain a detection image.

According to some embodiments of the present application, a gluing detection model is stored in the controller, and step S40 includes configuring the controller to:

in step S41, input the detection image to the gluing detection model to obtain gluing information for the battery to be detected output by the gluing detection model.

In an embodiment of the present application, the gluing detection model stores therein a variety of gluing types. After the detection image is input to the gluing detection model, the gluing information in the detection image may be quickly identified depending on the stored gluing types.

According to some embodiments of the present application, FIG. 13 is a training flowchart of a gluing detection model according to some embodiments of the present application. Referring to FIG. 13, a training process for the gluing detection model includes:

in step S101, acquiring a sample detection image including sample battery gluing obtained by photographing under the irradiation of a ray source;

in step S102, labeling true gluing information in the sample detection image;

in step S103, simultaneously inputting the sample detection image to the gluing detection model to obtain predicted gluing information for a sample battery output by the gluing detection model;

in step S104, computing a loss value based on the true gluing information and the predicted gluing information;

and in step S105, adjusting parameters of the gluing detection model based on the loss value.

In an embodiment of the present application, not only may the parameters of the gluing detection model be improved through the sample battery, but also the detection image for the battery to be detected 500 that is detected each time may be used to improve the parameters of the gluing detection model.

Exemplarily, after the detection is completed, abnormal gluing in the detection image may be marked to facilitate observation by working personnel as well as checking by the working personnel. If an error occurs, the parameters of the gluing detection model may be adjusted depending on the error to form a more accurate gluing detection model.

Exemplarily, the gluing detection model may continuously learn grayscale features of the detection image via a convolutional neural network, and adjust internal parameters, to improve the gluing detection model.

In an embodiment of the present application, before detecting, it is possible to first define various sizes and types of defective samples to be detected according to detection requirements to manufacture one sample battery, while labeling the true gluing information in the sample battery. Then detection is performed on the sample battery, and a comparison is performed with the true gluing information depending on the predicted gluing information for the sample battery output by the gluing detection model, continuously improving the parameters of the gluing detection model such that gluing detection is more accurate.

According to some embodiments of the present application, FIG. 14 is a control flowchart of a controller according to some embodiments of the present application. Referring to FIG. 14, step S40 includes further configuring the controller to:

in step S42, determine a proportion of abnormally glued area of the battery to be detected based on the detection image;

and in step S43, determine gluing information for the battery to be detected based on the proportion of the abnormally glued area.

In an embodiment of the present application, the proportion of the abnormally glued area is a standard for measuring abnormal gluing of the battery to be detected 500, and the gluing information for the battery to be detected may be determined depending on the proportion of the abnormally glued area.

The proportion of the abnormally glued area is a ratio of the abnormally glued area detected by the gluing detection model to a total glued area. Exemplarily, the total glued area may be identified through the detection image, or for batteries of the same type, the total glued area may be input into the controller.

According to some embodiments of the present application, referring to FIG. 11, the controller is further configured to:

in step S71, in response to the proportion of the abnormally glued area being greater than a preset value, determine that the battery to be detected is unqualified.

In an embodiment of the present application, when the proportion of the abnormally glued area is greater than the preset value, it indicates that gluing for the battery to be detected 500 is unqualified, which affects the stability of the battery to be detected 500, and that the battery to be detected 500 is determined to be unqualified.

According to some embodiments of the present application, referring to FIG. 11, the controller is further configured to:

in step S72, in response to the proportion of the abnormally glued area being less than or equal to the preset value, determine that the battery to be detected is qualified.

The controller 450 in the embodiment of the present application may control the complete detection of the battery to be detected 500, and may also detect a certain specific abnormal point as instructed. A location of the abnormal point may be directly input into the controller 450.

According to some embodiments of the present application, the preset value is greater than or equal to 10%, and less than or equal to 25%.

During production of the battery, it is difficult that gluing is completed without defects. If the preset value is set to be too small, for example, less than 10%, it may be possible that too many batteries are identified as being unqualified, affecting battery yield. If the preset value is set to be too large, for example, greater than 25%, it may be possible that the battery has a large abnormally glued area, affecting reliability of the battery. Setting the preset value to be greater than or equal to 10%, and less than or equal to 25% may improve the reliability of the battery while ensuring the battery yield to a certain extent.

An embodiment of the present application provides a battery production device, including a detection apparatus according to any one of the above embodiments.

The battery production device includes the detection apparatus 400, non-destructive detection may be performed on a battery to be detected 500 during production of the battery to be detected 500, to timely find abnormal gluing for the battery to be detected 500, thereby eliminating unqualified batteries to be detected 500 and improving the quality of the outgoing batteries to be detected 500.

The detection apparatus of the present application is further described below in conjunction with one exemplary embodiment.

The detection apparatus 400 includes a support frame 410, a ray source 420, a probe 430, and a carrying platform 440. The support frame 410 includes a C-arm, the ray source 420 and the probe 430 are, respectively, connected to two ends of the C-arm, with the probe 430 facing an exiting port of the ray source 420, and the C-arm is rotatable about a rotation axis O, such that during rotation, the probe 430 remains facing the exiting port of the ray source 420. The carrying platform 440 is movably located between the ray source 420 and the probe 430, and a moving direction of the carrying platform 440 is perpendicular to an extension direction A of the rotation axis O. A rotation angle $\alpha$ of the ray source 420 satisfies: $0°<\alpha\leq90°$.

The support frame 410 further includes a support seat 412 and a connecting arm 413, the connecting arm 413 is connected to the support seat 412, the connecting arm 413 has an arc track 4131, and a center of circle of the arc track 4131 is located at the rotation axis O. An outer arc surface of the C-arm has a protrusion 4111 matching the arc track 4131, and the protrusion 4111 is slidably located within the arc track 4131. The support frame 410 may further include a base 414, the base 414 is connected to the support seat 412 via a sliding guide rail, and a moving direction of the support seat 412 is parallel to the extension direction A of the rotation axis O.

Upon detection, scanning may be started from an edge at one side of the battery to be detected 500, detection for one region is completed with the C-arm reciprocating once at a small angle, and then C-arm is moved to detect another region. Moving proceeds according to a set procedure until detection of the battery to be detected 500 is completed, and then completed pictures are spliced together to form one complete detection image for the battery to be detected 500.

In an embodiment of the present application, the ray source 420 may be a 450 KV micro-focus open tube X-ray source, and the probe 430 may be a flat-panel probe, and effective detection area of the flat-panel probe should be greater than 30 cm*30 cm.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments may still be modified, or some or all of the technical features therein may be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the particular embodiments disclosed herein, but rather includes all technical solutions falling within the scope of the claims.

What is claimed is:

1. A detection apparatus for detecting battery gluing, comprising:
   a support frame, comprising a support arm;
   a ray source, connected to the support arm;
   a probe, connected to the support arm, with the probe facing an exiting port of the ray source;
   a carrying platform, located between the ray source and the probe, the carrying platform being used to hold a battery to be detected;
   wherein the ray source and the probe are rotatable about a same rotation axis, and a rotation direction of the ray source is the same as that of the probe, such that during rotation, the probe remains facing the exiting port of the ray source and the carrying platform is located between the ray source and the probe; and wherein
   the rotation axis is located on a carrying face of the carrying platform.

2. The detection apparatus according to claim 1, wherein the support arm includes a C-arm, the ray source is connected to one end of the C-arm, the probe is connected to the other end of the C-arm, and the C-arm is rotatable about the rotation axis.

3. The detection apparatus according to claim 2, wherein the support frame further comprises:
   a support seat;
   a connecting arm, connected to the support seat, the connecting arm having an arc track, and a center of circle of the arc track being located at the rotation axis;
   wherein an outer arc surface of the C-arm has a protrusion matching the arc track, and the protrusion is slidably located within the arc track.

4. The detection apparatus according to claim 1, wherein a rotation angle α of the ray source (420) satisfies: 0°<α≤90°.

5. The detection apparatus according to claim 1, wherein the carrying platform is movably located between the ray source and the probe, and a moving direction of the carrying platform is perpendicular to an extension direction of the rotation axis.

6. The detection apparatus according to claim 1, wherein the detection apparatus further comprises:
   a controller, the ray source being electrically and/or communicatively connected to the controller, and the probe being electrically and/or communicatively connected to the controller;
   wherein the controller is configured for:
   controlling the ray source and the probe to rotate about the rotation axis;
   when the ray source rotates, controlling the ray source to emit rays that pass through the battery to be detected on the carrying platform and are cast to the probe;
   acquiring a detection image for the battery to be detected based on the rays received by the probe;

and determining gluing information for the battery to be detected based on the detection image.

7. The detection apparatus according to claim 6, wherein when the support frame includes the support seat and the connecting arm, with the support arm including the C-arm, controlling the ray source and the probe to rotate about the rotation axis comprises configuring the controller to:
   control the C-arm to slide within the arc track of the connecting arm.

8. The detection apparatus according to claim 7, wherein controlling the C-arm to slide within the arc track of the connecting arm comprises configuring the controller to:
   control the C-arm to slide in the arc track along a first rotation direction;
   and control the C-arm to slide in the arc track along a second rotation direction, the first rotation direction being opposite to the second rotation direction.

9. The detection apparatus according to claim 6, wherein the battery to be detected comprises a bottom face, the bottom face has a glued region, and the controller is further configured to:
   control the bottom face of the battery to be detected to fit with a carrying face of the carrying platform.

10. The detection apparatus according to claim 6, wherein when the carrying platform is movable along the extension direction perpendicular to the rotation axis, the controller is further configured to:
   control the carrying platform to move along the extension direction perpendicular to the rotation axis such that the carrying platform is located between the ray source and the probe.

11. The detection apparatus according to claim 6, wherein acquiring a detection image for the battery to be detected based on the rays received by the probe comprises configuring the controller to:
   collect a plurality of original images based on the rays received by the probe;
   perform a three-dimensional reconstruction on the plurality of original images to obtain a bottom face detection image for the battery to be detected, the bottom face having the glued region;
   and determine a detection image for the battery to be detected based on the bottom face detection image.

12. The detection apparatus according to claim 6, wherein a gluing detection model is stored in the controller, and determining the gluing information for the battery to be detected based on the detection image comprises configuring the controller to:
   input the detection image to the gluing detection model to obtain the gluing information for the battery to be detected output by the gluing detection model.

13. The detection apparatus according to claim 12, wherein a training process for the gluing detection model comprises:
   acquiring a sample detection image including sample battery gluing obtained by photographing under irradiation of the ray source;
   labeling true gluing information in the sample detection image;
   simultaneously inputting the sample detection image to the gluing detection model to obtain predicted gluing information for a sample battery output by the gluing detection model;
   computing a loss value based on the true gluing information and the predicted gluing information; and
   adjusting parameters of the gluing detection model based on the loss value.

14. The detection apparatus according to claim 6, wherein determining the gluing information for the battery to be detected based on the detection image comprises further configuring the controller to:

determine a proportion of abnormally glued area of the battery to be detected based on the detection image;

and determine the gluing information for the battery to be detected based on the proportion of the abnormally glued area.

15. The detection apparatus according to claim 6, wherein the controller is further configured to:

in response to the proportion of the abnormally glued area being greater than a preset value, determine that the battery to be detected is unqualified.

16. The detection apparatus according to claim 15, wherein the preset value is greater than or equal to 10%, and less than or equal to 25%.

17. A battery production device, comprising the detection apparatus according to claim 1.

\* \* \* \* \*